Aug. 15, 1939  F. C. BEST  2,169,336
MOTOR VEHICLE
Filed Dec. 20, 1933   2 Sheets-Sheet 1
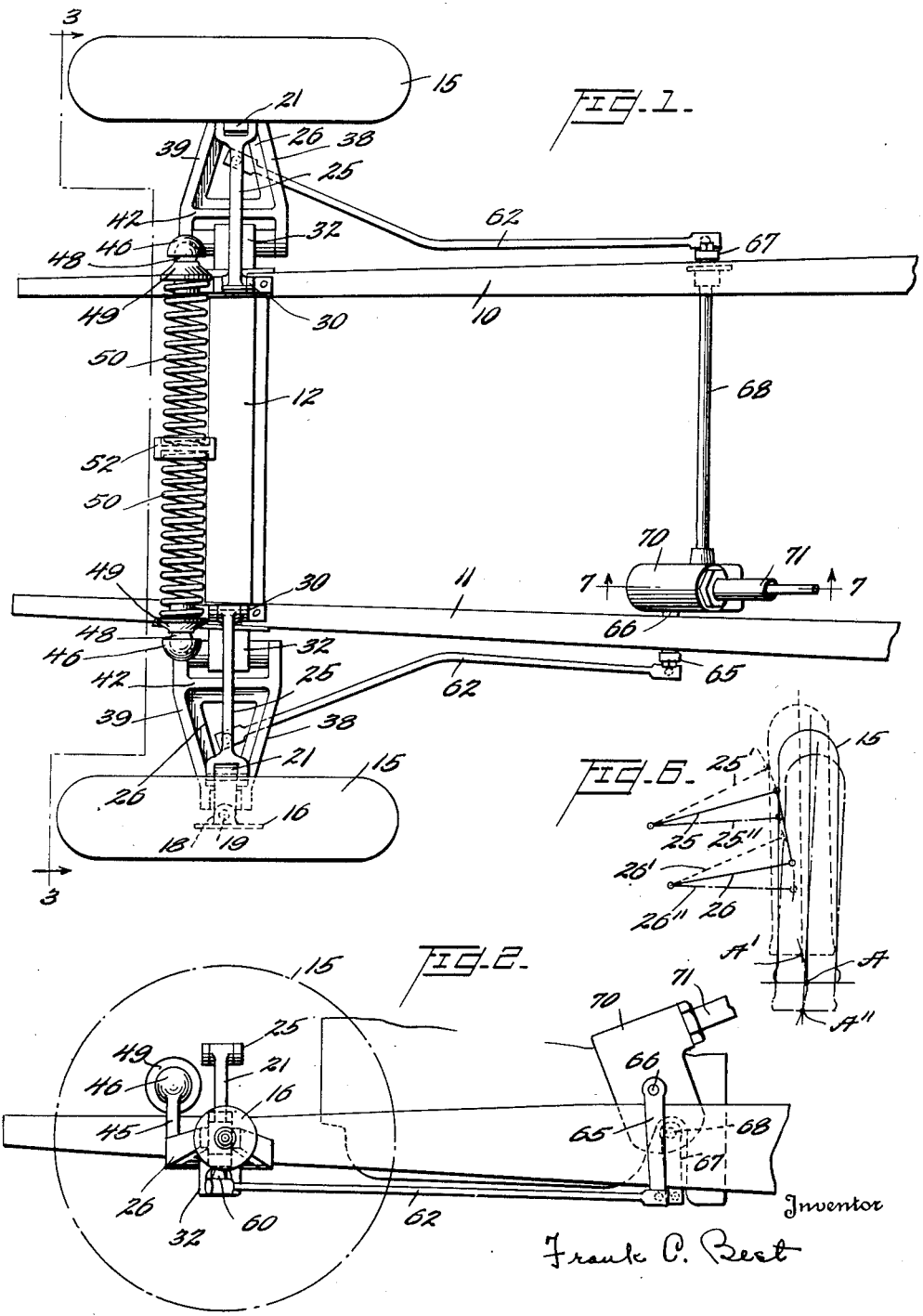
Inventor
Frank C. Best
By Watson, Cait, Morse & Grindle
Attorney Aug. 15, 1939   F. C. BEST   2,169,336
MOTOR VEHICLE
Filed Dec. 20, 1933   2 Sheets-Sheet 2
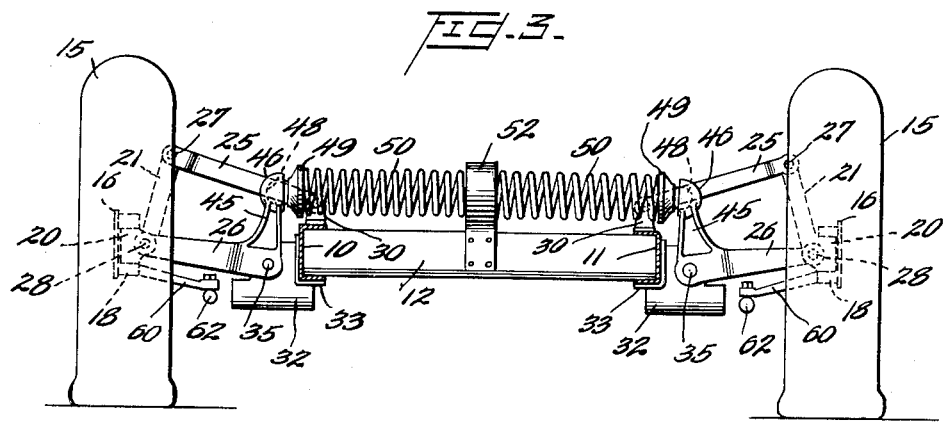
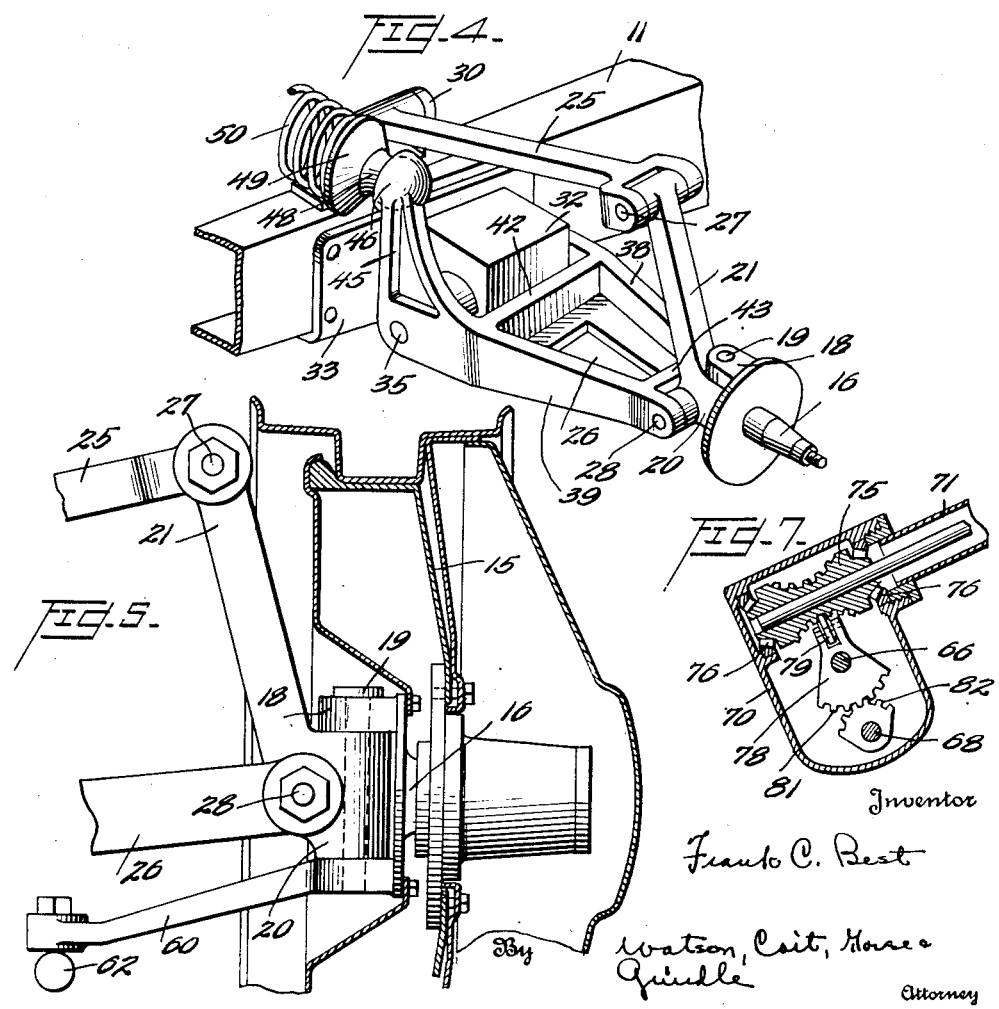
Inventor
Frank C. Best
By Watson, Cait, Horne & Grindle
Attorney Patented Aug. 15, 1939

2,169,336

UNITED STATES PATENT OFFICE 2,169,336

MOTOR VEHICLE

Frank C. Best, Detroit, Mich., assignor to Packard Motor Car Company, Detroit, Mich., a corporation of Michigan Application December 20, 1933, Serial No. 703,309

10 Claims. (Cl. 267—20)

This invention relates to motor vehicles and more particularly to means whereby the vehicle road wheels are supported for rising and falling movement and in the case of steerable road wheels, for steering movement, with respect to the vehicle frame.

In its preferred form, the invention is concerned with wheel suspensions of the type commonly referred to as independent, each of the road wheels at opposite sides of the vehicle being capable of executing rising and falling movement with respect to the vehicle without affecting the relationship of the opposite road wheel and the vehicle frame.

In the field of independent suspension for steerable road wheels there are two distinct and extreme methods of dealing with the rising and falling movement of the wheels, either of these methods being characterized by certain advantages. Thus one method involves the provision of a wheel suspension in which the wheels always remain parallel to the longitudinal plane of the vehicle frame and body regardless of any rising and falling movement of which the wheels may partake. In such a construction, the central portion of the tire tread always engages the ground when the vehicle is being driven straight ahead, there being no lateral displacement of the tread as the wheels rise and fall, with consequent reduction of wear. Furthermore, there is no change of the plane in which the wheels rotate as the result of rising and falling movement and consequently no gyroscopic force is developed such as is possibly responsible for the development of shimmy. This arrangement also results in substantial elimination of any tendency of the vehicle to turn to one side or the other in passing over a rough road bed.

However, in this type of construction when the vehicle is turned at such a rate of speed as to cause the body to lean outwardly, the wheels, being maintaind parallel with the body, also lean outwardly, and there is too much steering recovery. In other words, each wheel forms in effect a base of a cone of which the elements of the cone contact with the road surface, and thus the vehicle tends to return to the straight-ahead position, thereby making it difficult to maintain the road wheels at the proper angle to negotiate the turn.

The other extreme method employs a suspension in which the wheels tilt inwardly as they rise and outwardly as they fall below the normal position, the construction being such that as the vehicle is driven straight ahead each wheel always remains perpendicular to a line extending transversely of the vehicle and passing through the point of contact of the wheel tread with the ground and the intersection of the central vertical plane of the vehicle body with the ground. This construction is more satisfactory than that first described when the vehicle is turned, since the outward leaning of the vehicle body does not affect the relationship of the wheels to the ground, the wheels remaining vertical regardless of the extent of body sidesway. However, when the vehicle is driven straight ahead, the vertical displacement of the wheels in passing over rough ground results in excessive lateral tipping of the plane of the wheels and consequently objectionable gyroscopic forces are developed. Furthermore, excessive tire wear and a tendency to wander are also present.

It is the purpose of the present invention to effect a compromise between these two methods and to provide a construction minimizing the disadvantages and retaining to as large an extent as possible the advantages of both extreme methods. Thus it is proposed in the present invention to provide an independent wheel suspension for the steerable road wheels of the vehicle in which the plane of the wheels is tilted laterally to a limited extent as the wheels rise and fall with the result that steering is materially improved, the tendency to shimmy is eliminated, and the tire wear is reduced to practical limits.

It is a further object of the invention to provide a construction applicable either to independent or conventional wheel suspensions in which the steerable road wheels of the vehicle are so supported for steering movement as to substantially eliminate any tendency of the wheels to turn in either direction in driving over rough roads or in an emergency such as a tire blowout.

It is a further object of the invention to provide an independent wheel suspension for vehicle wheels which is simple and sturdy in construction and of low unsprung weight, and which in the preferred form employs coil springs extending transversely of the vehicle, the thrust of each spring substantially balancing that of the other to reduce the stresses applied to the frame.

It is a further object of the invention to provide an independent wheel suspension in which variation of the wheel tread is minimized, such variation as does occur being less during rising than during falling movement of the wheels, whereby on rounding a curve the outer wheel which carries most of the load will be subjected to the least displacement, thereby reducing wear on the tires.

Further objects and features of the invention will be apparent from the following description taken in connection with the accompanying drawings, in which Figure 1 is a plan view of a portion of a motor vehicle chassis illustrating the invention as applied to the front steerable road wheels of the vehicle;

Figure 2 is a side elevational view of the construction shown in Figure 1;

Figure 3 is a transverse sectional view on the line 3—3 of Figure 1;

Figure 4 is a perspective view of a portion of the wheel suspension at one side of the vehicle;

Figure 5 is a fragmentary vertical sectional view through a vehicle wheel illustrating the associated parts;

Figure 6 is a diagrammatic view illustrating the movement of which the road wheels partake as they rise and fall, and Figure 7 is a section on the line 7—7 of Figure 1 illustrating a portion of the steering mechanism.

In order to facilitate an understanding of the invention, specific language is employed in describing the various elements shown in the drawings which constitute the preferred form of the invention. It will nevertheless be understood that no limitation of the invention is thereby intended and that various alterations and changes are contemplated such as fall within the scope of the invention. Furthermore, while the invention has been illustrated as applied to the steerable road wheels of a vehicle, certain features of the invention are equally applicable to road wheels which are not steerable and certain features of the invention, as hereinbefore indicated, are applicable to wheel suspensions employing the conventional axle as distinguished from the independent type of wheel suspension.

The vehicle frame is represented as comprising the usual side frame members 10 and 11 and a cross frame member 12, the latter extending between and being secured to the side frame members in any convenient manner. The wheel suspension is generally of the pivoted link type and the construction is preferably identical at opposite sides of the center line of the vehicle. It will therefore suffice to describe the structure at one side of the vehicle only, similar reference characters being used to designate similar parts at opposite sides.

Thus each road wheel 15 is journalled for rotation on the wheel spindle 16, the latter being formed integrally with a steering knuckle 18 which is journalled for steering movement on a road wheel carrying member 20, the usual king pin 19 serving as the steering fulcrum for the wheel. While the axis of steering movement of the wheel is preferably substantially vertical, for purposes hereinafter described, it will be understood that in the broader aspect of the invention the relationship of this axis to the vertical is not material and it may be inclined with respect to the vertical to afford the usual wheel camber or to provide the conventional caster effect or both, and that no limitation of the invention with respect to the disposition of the steering axis of the wheel is intended except where such is specifically mentioned.

The road wheel carrying member 20, which in the application of the invention to non-steerable road wheels will of course support the wheel for rotation about an axis fixed with respect thereto, is provided with an upwardly extending arm 21, preferably forming an integral part of the member and described hereinafter as such. An upper wheel supporting link 25 is pivotally connected to the arm 21 as indicated at 27 for swinging movement with respect thereto about a horizontal or nearly horizontal axis and a lower wheel supporting link 26 is similarly connected as at 28 to the wheel supporting member 20. The inner ends of the wheel supporting links 25 and 26 are pivotally connected to the vehicle frame about axes which are parallel to the axes 27 and 28 of pivotal connection between the links and the member 20. Thus a yoke shaped bracket 30, seated on the upper side of the side frame member 11 and secured thereto, affords a fulcrum for the inner end of the link 25 and a shock absorber housing 32 having a flanged portion 33 is secured to the lower and outer sides of the side frame member 11 and affords a fulcrum for the lower wheel supporting link 26.

The shock absorbing mechanism within the housing 32 may be of the conventional type, for instance the customary hydraulic shock absorber. Displacement of the shock absorbing elements is effected by oscillation of a shaft 35 extending through the housing 32 and secured exteriorly of the housing on opposite sides thereof to the link 26, the link and shaft rocking about the axis of the latter. As shown more particularly in Figure 4 of the drawings the link 26 comprises two arms 38 and 39 which are maintained in spaced rigid relation, not only by the connection of these arms to the respective ends of the shaft 35, but by means of reinforcing web members 42 and 43 extending between the arms of the link and preferably formed integrally therewith. It will be observed that by this construction longitudinal and torsional stresses applied to the wheel supporting member 20 are transmitted to the frame primarily through the lower wheel supporting link 26, the upper wheel supporting link 25 being normally subjected only to relatively low compression stresses. Thus the lower link can be made quite sturdy as compared with the upper link with the result that the latter may be lighter and less expensive to construct and with the further result that the unsprung weight is maintained as low as possible, thus adding to the stability of the vehicle.

The lower link 26 is also formed to provide an upwardly directed arm 45 provided with a portion 46 having a substantially spherical seat therein to receive a complementary spherical head 48 formed on a member 49, the latter in turn affording a seat for a coil spring 50 extending transversely of the vehicle and reacting against a bracket 52 secured to the cross frame member 12 adjacent the center line of the vehicle. The cooperating surfaces of the members 48 and 46 may be supplied with lubricant in any desired manner and other steps may be taken to reduce the friction between these members to a minimum to facilitate relative rocking movement thereof so that the member 49 may always remain substantially perpendicular to the axis of the spring 50, thereby avoiding unnecessary stress in the spring convolutions.

The operation of the structure thus far described will now be apparent. As the road wheel rises, the links 25 and 26 will swing upwardly about their points of pivotal connection on the vehicle frame, compressing the coil spring 50. At the same time, the shaft 35 is rocked to actuate the shock absorbing mechanism within the housing 32 for the purpose of damping the movement of the wheel. The wheel may be swung for steering movement on the wheel carrying member 20 by mechanism hereinafter described.

The disposition of the coil springs transversely of the frame is not only extremely convenient, but results in reduction of the stresses in the frame to a minimum by reason of the fact that the springs 50 at opposite sides of the vehicle exert oppositely directed and equal thrust on the member 52, and thus this member can be made relatively light with consequent reduction in weight and cost. The member 52 will only be subjected to the action of unequal forces as the vertical position of one wheel changes with respect to the other wheel, and under such conditions the resultant force will only be that due to the variation from the normal force exerted by the springs due to the initial compression thereof.

It will be apparent from Figure 3 of the drawings, which shows the road wheel in its normal or mid-position, that in the preferred form of the invention the wheel supporting links 25 and 26 are not parallel, the upper link 25 being inclined upwardly from its point of pivotal connection with the vehicle frame to a greater extent than the lower link 26. Furthermore, the upper link is considerably longer than the lower link. While variations of this arrangement may be made without sacrifice of the desired result, it will be understood that the construction illustrated in the drawings is preferred for the purpose of obtaining that movement of the wheels which is found most desirable and which is illustrated diagrammatically in Figure 6 of the drawings.

Thus in Figure 6, the links 25 and 26, the wheel carrying member 20, and the road wheel 15 are shown in full lines in their normal positions, the point of contact of the wheel tread with the ground being indicated at A, the plane of the wheel being substantially vertical as indicated by the full line passing through the point A. When the wheel rises on meeting an obstruction, the links 25 and 26 move upwardly to the positions indicated at 25' and 26' respectively, the wheel occupying the upper position shown in dot and dash lines and the point of contact of the center of the wheel tread with the ground being indicated at A'. On downward movement of the wheel from normal or mid-position, the wheel supporting links occupy the positions indicated at 25" and 26" respectively and the wheel occupies the lower position shown in dot and dash lines, the point of contact of the center of the wheel tread with the ground being indicated at A". As will be apparent from the curve drawn through the points A, A' and A", there is practically no change in tread for a vertical movement of approximately two inches and with the maximum range of movement illustrated in the drawings in which the wheel is illustrated as displaced nearly four inches on either side of the normal position thereof, the error is so small as to be negligible for all practical purposes. Thus scuffing of the tires is reduced to a minimum without sacrificing any of the advantages obtained by displacement of the plane of the wheel with respect to the vehicle frame as hereinbefore pointed out. Furthermore, the arc traced by the center of the tread as the wheel rises and falls is flatter above than below the normal position. Thus in rounding a curve at sufficient speed to cause the vehicle body and frame to lean outwardly, producing upward movement of the outer wheel and downward movement of the inner wheel with respect to the frame, the outer wheel which carries the major portion of the load will be subjected to less lateral displacement than the inner wheel to further reduce unnecessary wear of the tires.

It will be apparent from an inspection of Figures 3 and 5 of the drawings that the road wheel carrying member 20 extends well within the central portion of the wheel, the axis of the king pin 19 being substantially vertical and being located closely adjacent or approximately in the central plane of the wheel. As shown in Figure 2 of the drawings, the desired caster effect is obtained by locating the king pin axis slightly forward of the axis of the wheel spindle.

In conventional construction in which the king pin is inclined outwardly and downwardly with respect to the plane of the wheel and intersects the road surface at a point laterally of and inside the point of contact of the center of the tread with the ground, the vehicle tends to steer to one side or the other upon brake application if the brakes are not properly equalized, the line of braking force being offset from the axis of the king pin. Furthermore, if the wheel meets an obstruction, this force is increased due to the fact that the tread meets the obstruction at a point above the road bed and thus still further displaced laterally from the axis of the king pin. Similarly in the case of a tire blow-out the point of contact between the tire and the ground is closer to the wheel spindle as the result of the flattening of the tire, and the horizontal distance between the king pin axis and the center line of the tire is accordingly materially increased, this effect being responsible for the usual difficulty experienced in controlling a vehicle with a flat tire. Again, the center of gravity of the wheel, tire, hub and brake is located at a considerable distance from the axis of the king pin and there is thus a tendency for these parts to wobble as a unit around the king pin axis in passing over a rough road.

In the preferred embodiment of the invention, in which the king pin axis is substantially vertical and is located in the plane of the road wheel or slightly displaced inwardly therefrom, for instance a displacement of half an inch, the turning moment developed when the brakes are applied, when the wheel meets an obstruction, or upon tire blow-out are reduced to a negligible minimum and absolute safety and positive control of the vehicle under all conditions are ensured. Obviously when a vertical king pin is employed, the moment about the king pin axis is not increased when an obstruction is met or a blow-out occurs.

The same comment may be made with respect to the disposition of the king pin axis ahead of the wheel spindle axis to give the desired caster effect as distinguished from conventional constructions in which the king pin is inclined forwardly and downwardly. With the present arrangement there is no alteration of the force tending to turn the wheel about the axis of the king pin when an obstruction is met or when a blow-out occurs as is present when a king pin having the usual caster angle is employed. Thus under all conditions of operation the caster effect is balanced at opposite sides of the vehicle and varying road conditions do not influence the steering. The center of gravity of the entire wheel assembly is located substantially on the axis of the king pin and there is thus no tendency to wobble such as is present under conventional practice.

While the location of the king pin axis with respect to the wheel is a feature of importance regardless of the nature of the wheel suspension as a whole, it will be apparent that in a wheel suspension of the type disclosed in this application employing pivoted links, the location of the king pin axis substantially in the load plane of the wheel results in lowering the stresses in the outer bearing and consequently the loads on the bearings of the upper link. Thus one of the chief difficulties heretofore encountered, namely the provision of adequate bearing strength in independent wheel suspensions and more particularly in suspensions of the parallel link type, is overcome by means of the present invention.

While it is possible to employ various types of steering mechanism with the wheel suspension illustrated herein, the use of separate steering drag links for the steerable road wheels of the vehicle is preferred. Thus each steering wheel knuckle is provided with an inwardly extending arm 60, integral therewith or secured rigidly thereto, each arm having an articulated connection with a steering drag link 62. At the left-hand side of the vehicle a steering arm 65 secured rigidly to a rotatable shaft 66 is pivotally connected with the rear end of the associated drag link and a similar articulated connection is provided at the right-hand side of the vehicle between an arm 67 depending from and secured on a shaft 68 and the rear end of the adjacent drag link 62. The shaft 68 extends transversely across the vehicle frame and the shaft 66 extends through the adjacent side frame member 11 of the frame, both shafts passing within a steering gear housing 70 located at the lower end of the usual steering column 71 and containing gearing operable by the conventional steering handwheel.

The preferred form of gearing is shown in Figure 7 of the drawings and includes a worm 75 rotatable with the steering column and preferably journalled in the steering housing as indicated at 76. A worm gear of the anti-friction type and comprising a member 78 having a roller 79 rotatably mounted therein and engaging the threads of the worm 75, is secured to the shaft 66. The member 78 is further provided with a toothed portion 81 meshing with a segmental gear 82 secured to the shaft 68, the ratio of the gearing between the members 78 and 82 being proportioned to the length of the arms 65 and 67. Thus although these arms are of different length in order that the rear ends of the drag links 62 may lie substantially in the same horizontal plane, the correction effected by the gearing in question permits linear displacement of the two drag links of the same extent for a predetermined rotational movement of the steering column 71.

With this arrangement, proper and positive steering control may be effected under all conditions and the construction is safer by reason of the employment of two drag links. Thus on failure of one link, the other may continue to function so that the vehicle may be controlled.

It will be observed that the present invention affords a wheel suspension combining maximum strength with minimum weight and cost and a very low center of gravity. It is particularly significant that the unsprung weight is extremely low, resulting in easier riding and more stability under varying road conditions than can be obtained with other types of wheel suspension.

Numerous modifications of the preferred construction can be made without sacrificing the desired result. For instance, under some circumstances it may be advisable to incline the pivotal axes of the wheel supporting links 25 and 26 slightly with respect to a horizontal plane and these axes may also be inclined at a very considerable angle with respect to the longitudinal vertical plane passing through the center line of the vehicle. While such variations of the preferred construction are not specifically claimed herein, it will be appreciated that they fall within the scope of the invention in its broader aspect.

Having thus described the invention, what is claimed as new and desired to be secured by Letters Patent is:

1. In a motor vehicle, the combination with a vehicle frame, of a road wheel, a road wheel carrying member, and means supporting said road wheel on said frame for rising and falling movement with respect thereto, said means comprising a pair of vertically spaced links, each link being pivotally connected to said frame and to said member and extending outwardly and upwardly from the point of pivotal connection thereof to the frame in the normal position of the road wheel, the upper of said links being longer and having the greater upward inclination, whereby less tread variation will occur when the wheel rises than when it falls from the normal position.

2. In a motor vehicle, the combination with a vehicle frame, of a road wheel, a road wheel carrying member, and means supporting said road wheel on said frame for rising and falling movement with respect thereto, said means comprising a pair of vertically spaced links, each link being pivotally connected to said frame and to said member, one of said links being connected with said frame at points spaced in the pivotal axis thereof, the upper of said links being longer and having the greater upward inclination, whereby less tread variation will occur when the wheel rises than when it falls from the normal position.

3. In a motor vehicle, the combination with a vehicle frame, of a road wheel, a road wheel carrying member, and means supporting said road wheel on said frame for rising and falling movement with respect thereto, said means comprising a pair of vertically spaced links, each link being pivotally connected to said frame and to said member and extending outwardly and upwardly from the point of pivotal connection thereof to the frame in the normal position of the road wheel.

4. In a motor vehicle, the combination with a vehicle frame, of a road wheel, a road wheel carrying member, and means supporting said road wheel on said frame for rising and falling movement with respect thereto, said means comprising a pair of vertically spaced links, each link being pivotally connected to said frame and to said member, the upper of said links having a substantially greater length than the lower link.

5. In a motor vehicle, the combination with a vehicle frame, of a road wheel, a road wheel carrying member, and means supporting said road wheel on said frame for rising and falling movement with respect thereto, said means comprising a pair of vertically spaced links, each link being pivotally connected to said frame and to said member, the pivotal axes of said links being so disposed with respect to the frame and wheel in the normal position of the latter that less tread variation will occur when the wheel rises than when it falls from the normal position.

6. In a motor vehicle, the combination with a vehicle frame, of road wheels disposed at opposite sides of said frame, and means supporting said road wheels for independent rising and falling movement and simultaneous tilting movement with respect to said frame from a normal position, said means displacing the wheel tread to a less extent during rising than during falling movement, whereby tread wear on the outer wheel as the vehicle is turned may be minimized.

7. In a motor vehicle, the combination with a vehicle frame, of a road wheel, a road wheel carrying member, and means supporting said road wheel on said frame for rising and falling movement with respect thereto, said means comprising a pair of vertically spaced links, each link being pivotally connected to said frame and to said member and extending outwardly and upwardly from the point of pivotal connection thereof to the frame in the normal position of the road wheel, the upper of said links being longer and having the greater upward inclination, the relative length and inclination of said links being such that the wheel is tilted inwardly as it rises, whereby tread variation is minimized.

8. In a motor vehicle, the combination with a vehicle frame, of a road wheel, a road wheel carrying member, and means supporting said road wheel on said frame for rising and falling movement with respect thereto, said means comprising a pair of vertically spaced links, each link being pivotally connected to said frame and to said member and extending outwardly and upwardly from the point of pivotal connection thereof to the frame in the normal position of the road wheel, the upper of said links being longer and having the greater upward inclination, the disposition of the pivotal axes of the links being such that as the wheel either rises or falls from a normal position, the angular relation of the plane of the wheel with respect to the frame and with respect to a line connecting the wheel tread and the intersection of the central vertical plane of the frame and the road will be altered.

9. In combination with the frame and the support for a wheel of a vehicle, an arm pivoted to said frame and connected to said wheel support in the medial plane of the wheel, means connected to said wheel support and to said frame and guiding said wheel support for up and down movement relative to the frame, and resilient means acting between said arm and frame.

10. In combination with the frame and the support for a wheel of a vehicle, an elongated member resiliently connected to said frame and extending laterally therefrom, said member being movably connected to the wheel support in the medial plane of the wheel, and resiliently supporting the frame from the wheel support, and means connected to said wheel support for guiding said wheel for up and down movement relative to the frame.

FRANK C. BEST.